United States Patent
Haferl et al.

(10) Patent No.: US 9,680,251 B2
(45) Date of Patent: Jun. 13, 2017

(54) GAPPING MEASUREMENT SENSOR FOR HV CONNECTOR

(75) Inventors: Stephan Haferl, Fribourg (CH); Iris Schmid, Liebefeld (CN); Dominique Corpataux, Belfaux (CN)

(73) Assignee: COMET HOLDING AG, Flamatt (CH)

( * ) Notice: Subject to any disclaimer, the term of this patent is extended or adjusted under 35 U.S.C. 154(b) by 265 days.

(21) Appl. No.: 14/414,937

(22) PCT Filed: Jul. 11, 2012

(86) PCT No.: PCT/EP2012/063554
§ 371 (c)(1),
(2), (4) Date: Jan. 15, 2015

(87) PCT Pub. No.: WO2014/008934
PCT Pub. Date: Jan. 16, 2014

(65) Prior Publication Data
US 2015/0171544 A1    Jun. 18, 2015

(51) Int. Cl.
*G01L 1/00*     (2006.01)
*H01R 13/53*    (2006.01)
(Continued)

(52) U.S. Cl.
CPC ......... *H01R 13/53* (2013.01); *H01R 13/6215* (2013.01); *H01R 13/6683* (2013.01); *H01R 2101/00* (2013.01); *H02G 15/06* (2013.01)

(58) Field of Classification Search
CPC ............ H01J 35/165; H01J 2235/0233; H01R 13/639; H01R 13/53; H01R 2101/00;
(Continued)

(56) References Cited

U.S. PATENT DOCUMENTS

| 6,525,992 B1* | 2/2003 | Olivier | G01V 1/201 |
| | | | 114/245 |
| 7,517,242 B2* | 4/2009 | Brodersen | H01J 35/165 |
| | | | 439/488 |
| 2009/0081902 A1* | 3/2009 | Montena | H01R 13/641 |
| | | | 439/578 |

FOREIGN PATENT DOCUMENTS

EP    1 646 268 A2    4/2006

OTHER PUBLICATIONS

International Search Report (Mar. 25, 2013) for corresponding International App. PCT/EP2012/063554.

* cited by examiner

*Primary Examiner* — Harshad R Patel
*Assistant Examiner* — Brandi Hopkins
(74) *Attorney, Agent, or Firm* — WRB-IP LLP

(57) ABSTRACT

A cable for connecting to a connector of a high-voltage device includes an integral yield sensor. The yield sensor may be a pressure or force sensor, or a displacement sensor, including a stator part and a mobile part, and a spring for maintaining a compression force on the end portion of the cable towards the connector of the high-voltage device. The displacement sensor can include a Hall effect sensor and a linear array of magnetic elements arranged such that the Hall effect sensor moves relative to the linear array if there is any movement between the stator and mobile parts of the sensor, The magnetic field readings are interpreted in order to determine the amount of movement. A system for controlling a high voltage device in response to pressure and other information received from sensors in the cable is also provided.

20 Claims, 3 Drawing Sheets

(51) Int. Cl.
*H01R 13/621* (2006.01)
*H01R 101/00* (2006.01)
*H02G 15/06* (2006.01)
*H01R 13/66* (2006.01)

(58) Field of Classification Search
CPC  H01R 13/5202; H01R 13/625; H01R 13/622; H01R 13/5205; H01R 24/40; H01R 13/646; H01R 24/42; H01R 2103/00; H01R 9/0524; H01R 9/05; H01R 43/26; H01R 13/5025; H01R 13/62; H01R 9/0527; H01R 43/16; H01R 43/00; H01R 4/48; H01R 9/0521; H01R 43/20; H01F 38/14; G01N 27/286; G01R 1/06788; G01R 1/06794; G01R 1/36; G01R 35/005; G01R 3/00; G01R 35/007; G01F 23/00; H01P 1/24; Y10T 156/108; Y10T 29/49195; Y10T 29/4974; Y10T 29/49208; Y10T 29/49204; E02F 3/435; E02F 9/26
USPC ....... 73/862.02, 799, 862.335, 862.392–393; 439/470, 752; 174/19, 73.1, 11 BH
See application file for complete search history.

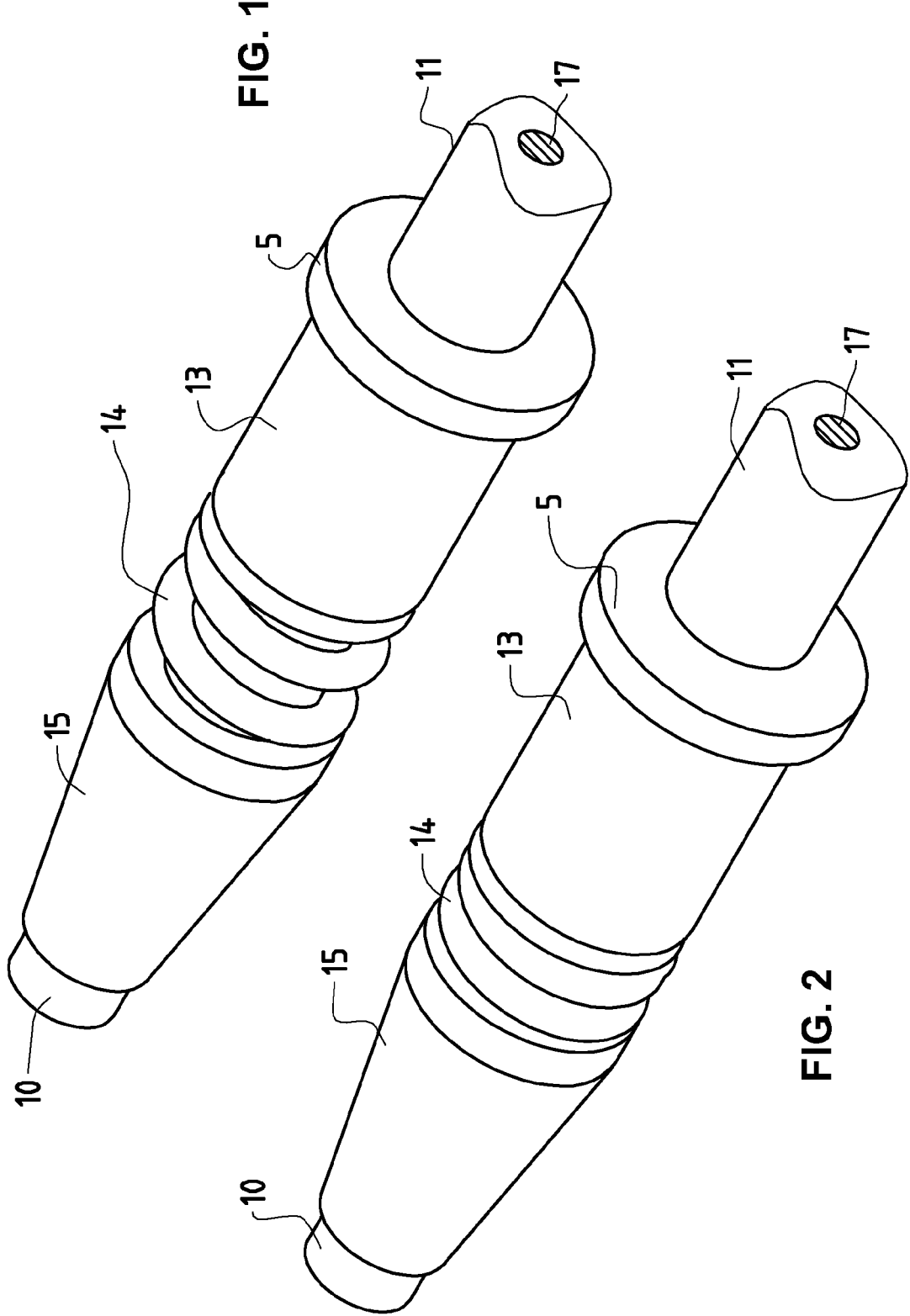

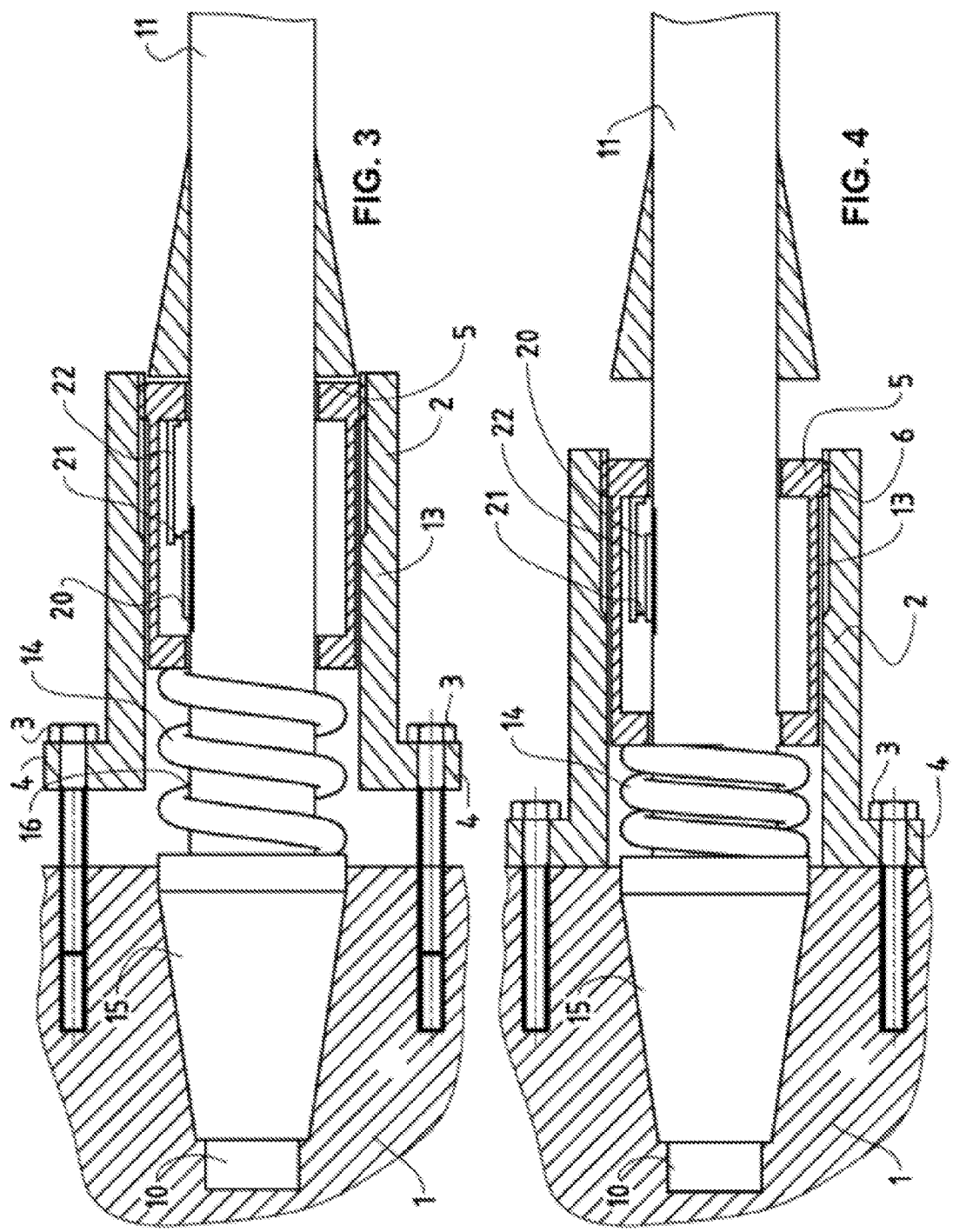

GAPPING MEASUREMENT SENSOR FOR HV CONNECTOR

BACKGROUND AND SUMMARY

The invention relates to the field of high-voltage (HV) cables, such as are used for example for connecting under compression to X-ray emitter units and the like. In particular, but not exclusively, the invention relates to HV cables which comprise means for indicating the current amount of spring compression in the connection.

Cables for connecting voltage sources operating at potential differences of hundreds or even thousands of kilovolts requite high performance insulation and reliable, durable connections. Such a cable may typically comprise a substantially straight central conductor, also known as the lead wire, which is usually flexible, to allow a certain flexing of the cable, encapsulated in a thick, high performance insulator. The end of the cable may typically be provided with an insulated male conical plug which is designed to be inserted into a corresponding female conical socket of a high voltage device. One or both of the conical ping and socket typically comprise a compressible outer layer of insulating material such that, when the plug and socket are pressed together, the male and female insulating parts mate to provide a high level of insulation, even at their physical interface. The plug and socket must be kept under sufficient compression for the connection to retain its insulation integrity. This compression can be achieved by means of a compressible elastic element such as a coil spring, which is compressed during the connection process and remains compressed until the connection is released. The amount of force to be exerted on the end of the cable can be set by compressing the spring a certain distance at the time of connection, in a process commonly referred to as "gapping". This term refers to the setting of the spring compression by adjusting a gap between a spring-compression plate and the socket.

The elastic insulation materials may expand and contract with fluctuations in temperature, and the materials may gradually soften and yield with time, especially if the device is regularly operating at high temperatures. The compression spring may extend or contract slightly to allow for such short-term expansions and contractions, and to maintain the compression force on the connector. As the insulation material gradually gives, the spring gradually extends, with the result that the force on the connector gradually wanes, and the likelihood of an unwanted electrical discharge through the insulator interface increases as a consequence. For this reason, this type of connector requires regular "re-gapping". An adjustment means is provided for re-adjusting the amount of compression in the spring and thereby resetting the compression force at the interface between the connector insulator cones.

European patent application EP1646268 (Yxlon International X-Ray GmbH) describes an example of such a connection arrangement. In the arrangement of EP1646268, a separate clamping collar is used to clamp the end of the cable to the connector of the high-voltage device. The collar contains a pre-compressed spring arranged such that, when the clamping force between the collar and the high-voltage device exceeds the compression on the spring, any further increase in the clamping force results in an increased compression of the spring. In this way, the risk of over-tightening the connection can be reduced, and the spring can maintain the force between, the mating conical insulators when the insulation begins to give. The spring is held in compression by a plate or housing of the collar, and provides a force which urges a cable-engaging element towards the high-voltage device when the sprung collar is fitted to the cable. The cable is provided with a collar-engaging element, for example having an external thread. The removable sprang collar is provided with a cable-engaging element which is longitudinally mobile within the collar housing. The cable-engaging element of the sprung collar has an internal thread for engaging with the thread of the collar-engaging element of the cable.

When engaged with the cable and screwed to the high-voltage device, the spring in the collar pushes on the collar-engaging element of the cable, which is rigidly connected to the male conical part (the end portion) of the connector, thereby urging it into the female conical connector of the high-voltage device.

Gapping and re-gapping (ie adjusting the compression in the connector interface) can be carried out by adjusting the threaded engagement between the cable-engaging element of the sprung collar and the collar-engaging element of the cable, in order to adjust the relative positions of the two engaging elements.

If the cable must be removed or replaced, the separate clamping collar is removed, and can be re-used on the replacement cable. The sprang collar also includes an indicator peg, secured to the cable-engaging element. The indicator peg moves gradually along a slot in the outer housing of the sprung collar as the spring gradually extends over time. When the indicator peg of the collar has moved a certain distance relative to the housing, an operator can visually detect that the connection must be re-gapped. He or she then undoes the collar, adjusts the position of the collar relative to the cable (by turning the collar, for example, so as to rotate the threaded part of the collar relative to the threaded part of the cable), re-fits the collar on to the cable (or on to a replacement cable if the cable must be replaced), and re-tightens the clamping screws in order to clamp the connection once more under compression.

Such re-gapping is typically carried out at regular service intervals (every few months, for example) by specialist operatives. The compression in the connector can be approximately gauged by observing the position of the indicator peg relative to markings on the housing. However, such indicators are inaccurate. Furthermore, visual inspection requires that an operator be in close proximity with the device. Since this type of connector may be used with equipment such as X-ray machines, it is often not possible to observe the machine while it is operating. To this end, EP1646268, also proposes the use of electrical or magnetic switches for signalling (on a remote display, for example) that re-gapping of the connector is required (ie when the spring has extended by a predetermined distance). The particular sensors required are integrated into the removable collar, along with the spring. As an alternative, the re-gapping alert can be triggered by means of a pressure sensor which detects when the force provided by the spring falls below a certain pre-settable threshold. Again, the pressure sensor is integrated into the removable collar.

In the variants disclosed in EP1646268, the purpose of the re-gapping sensor is to indicate the compression of the spring between the housing and the cable-clamping element of the sprung collar.

If an electrical or magnetic or pressure sensor is used in the arrangement of EP1646268, then it must be set to trigger well before re-gapping is required, in order to allow a margin of time in which to prepare and carry out the operation. In many instances, therefore, re-gapping will be carried out before the operation is truly necessary.

The clamping collar described in EP1646268 may be used with different types of cable. Each time a cable is replaced, the clamping collar, with its integrated spring and re-gapping indicator, is re-used to damp the new cable. However, the spring and re-gapping indicator may not be optimum for use with the replacement cable, which may result in incorrect gapping or a misleading re-gapping indication.

BRIEF DESCRIPTION OF THE DRAWINGS

The invention will now be described with reference to the attached drawings, in which:

FIGS. 1 and 2 show in schematic, perspective view, a connector assembly at the end of a cable according to the present invention.

FIGS. 3 and 4 show in schematic, semi-sectional view, how the end of a cable according to the present invention can be clamped to a high-voltage device using a detachable clamping collar.

DETAILED DESCRIPTION

Figure 5:
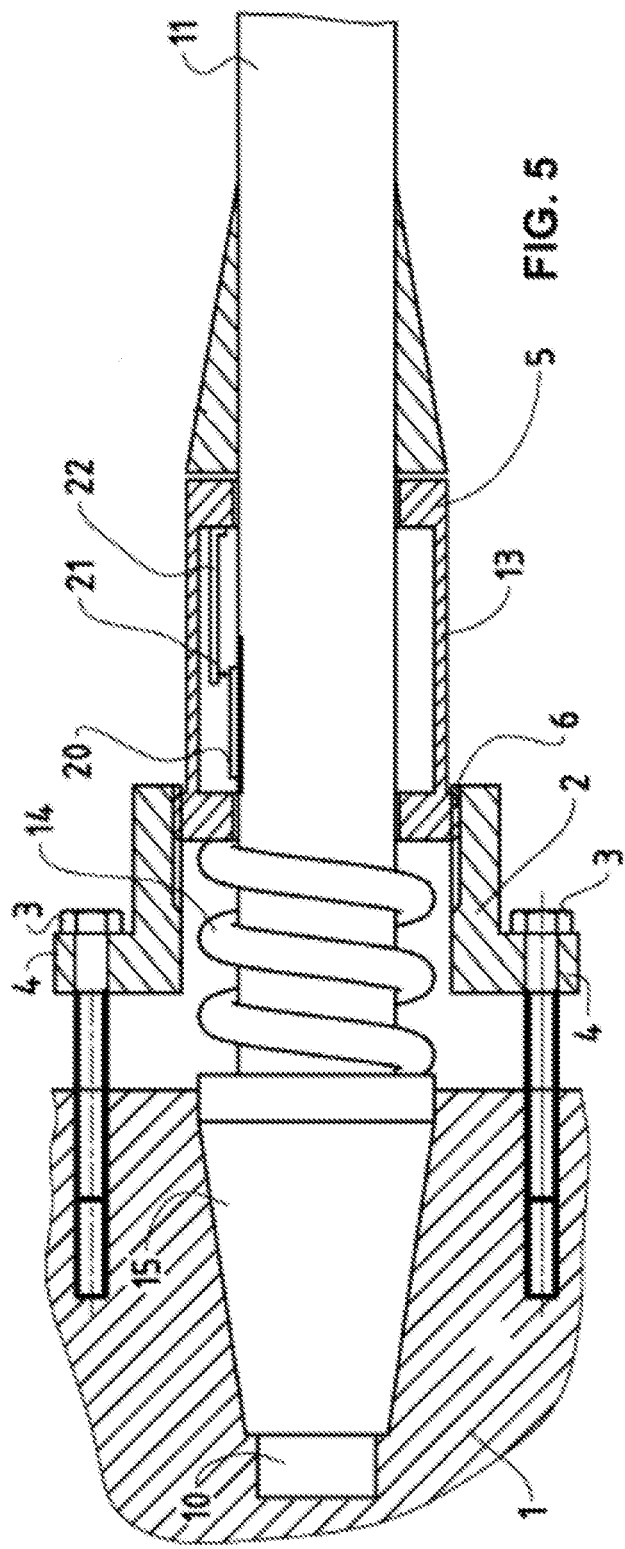
FIG. 5 shows in schematic, semi-sectional view, how the end of another cable according to the present invention can be clamped to a high-voltage device using a detachable clamping collar.

The cable and system of the invention will now be described in more detail with reference to FIGS. 1 to 5. Note that the drawings ate provided for explanatory purposes only, and are intended merely to indicate an example of how the invention can be realized. The drawings should not be taken as limiting the scope of protection, which is set out in the accompanying claims. The use of the same reference numbers in different drawings is intended to indicate that the references refer to the same or corresponding features.

As mentioned above, FIGS. 1 to 5 describe an exemplary implementation of a cable according to the invention. The cables illustrated in the figures comprise: one or more conductor cores 17 surrounded by insulation 11, a collar-engaging element 5, shaped as a cylinder having a cylinder wall 13, a spring 14, an insulated end portion 15 and an electrical contact 10. FIG. 1 shows the cable in an initial state, in which the spring 14 is in its extended condition. FIG. 2 shows the cable of FIG. 1 with the spring 14 in a compressed condition. The spring 14 can be compressed by displacing the collar-engaging element 5 towards the end portion 15 of the cable. The collar-engaging element is longitudinally mobile with respect to the insulation 11 of the cable. The end portion 15 of the cable is shaped to fit snugly with a correspondingly-shaped connector profile of the high-voltage device 1, such that the insulation of the end portion 15 and the insulation of the connector of the high-voltage device 1 can be compressed together to form a substantially gap-free interface along which no electrical discharge can pass. The mating connectors are advantageously formed as conical shapes, although other shapes could also be used.

The configuration and operation of the cable will be better understood with reference to FIGS. 3 and 4, which show the end region of the cable, the detachable collar 2, and the connector socket of the high-voltage device 1.

The high-voltage device 1 is depicted as a conical female socket, into which fits the male end portion 15 of the cable. The cable also comprises a collar-engaging element 5, which is longitudinally mobile with respect to the insulation 11 of the cable. The collar-engaging element 5 serves to engage with the collar 2 in such a way that, if the collar is displaced towards the high-voltage device 1, then the collar-engaging element 5 is also displaced towards the high-voltage device, thereby compressing the spring 14 between the collar-engaging element 5 and the end-portion 15 of the cable. As shown in FIGS. 3 to 5, the separate clamping collar can be pulled towards the high-voltage device by means of screws 3 and collar flange 4, for example. The engagement between collar 2 and collar-engaging element 5 can be, for example, by means of cooperating threads 6, which also permit adjustment of the longitudinal position of the collar with respect to the collar-engaging element 5. This arrangement also allows the clamping collar to be easily attached to and removed from the cable. The collar is significantly simpler in construction than prior art collars, in which the spring and re-gapping indicator were integrated into the collar.

The operation of the removable clamping collar is as follows: the collar is first attached to the collar-engaging element 5 of the cable. In the illustrated examples, this is done by screwing the internal thread of the collar 2 on to the external thread of the collar-engaging element 5. The longitudinal position of the collar 2 on the cable may then be adjusted, for example by screwing the collar 2 more or less on to the collar-engaging element 5. Once in place on the cable, the end of the cable can be inserted into the socket of the high-voltage device 1, and the clamping collar 2 can then be fastened to the high-voltage device 1 by means of screws 3 and flange 4, for example. FIG. 3 depicts the cable and collar 2 in this configuration: screws 3 have been tightened to the point where the conical end portion 15 of the cable fits snugly but is not yet compressed against the high-voltage device 1. The size of the gap between the flange 4 and the opposing face of the high-voltage device 1 then informs the operator how much force will be exerted on the end portion once the screws 3 have been tightened to pull the flange and the face of the high-voltage device 1 into tightly pressed contact (as illustrated in FIG. 4). The operator knows (from reading the instructions supplied with the cable, for example) that a gap of, say, 4-5 mm will result in the correct amount of force when the screws are tightened.

When the cable connection has been in operation for some time, the connection may need to be re-gapped. In order to determine whether or not re-gapping is required, the operator could unscrew the screws until the conical end-portion 15 of the cable still fits snugly (but without compression force) against the high-voltage device 1 (this configuration can be termed the reference configuration), and then check, the gap between the flange 4 and the high-voltage device 1. If the gap is still within the 4-5 mm tolerance, then the connector can be re-tightened. If, on the other hand, the gap is now outside the tolerance range, or near the tolerance limit, then the connection should be re-gapped by readjusting the position of the clamping collar 2 on the collar-engaging element S of the cable.

However, the cable is provided with a yield sensor (displacement indicator 20, 21, 22), arranged to indicate the amount of displacement in the end portion 15 of the cable relative to the high-voltage device 1, so that the operator can determine whether re-gapping is required, without disconnecting the cable from the high-voltage device.

The displacement indicator, also referred to as the displacement sensor, the re-gapping indicator, or the re-gapping sensor, is shown as comprising a stator element 22, which is shown secured to the collar-engaging element 5, for example, and a mobile element 20, which is shown secured to the insulation of the cable. A sensor element 21 is also provided, for detecting a longitudinal, displacement between the mobile 20 and stator 22 elements. The sensor element 21 can be secured with respect to either of the stator element 22 or the mobile element 20.

Note that in this description the terms "mobile" and "stator" take as their frame of reference the high-voltage device 1. Thus, when the cable is connected, with the collar-engaging element 5 rigidly engaged with the collar 13 (and therefore with the high-voltage device 1), the collar-engaging element 5 is considered to be static. The motion referred to is the motion of the body (the insulation 11, for example) of the cable with respect to the collar-engaging element 5. The collar-engaging element 5 is manufactured as an integral, albeit longitudinally displaceable, part of the cable.

The displacement indicator (20, 21, 22) may be configured as a binary detector for detecting a threshold transition between a "re-gapping not required" state and a "re-gapping required" state when the mobile element 20 has been displaced longitudinally by a predetermined distance relative to the stator element 22 as a result of the spring 14 extending due to the gradual "give" of the insulation at the interface between the end portion 15 of the cable and the connector 1 of the high-voltage device.

The displacement indicator may advantageously be configured as a multi-value or analogue defector, for example for determining a value of the distance traveled, or of the relative longitudinal velocity, or of an acceleration, of the displacement between, mobile 20 and stator 22 elements of the displacement indicator in the cable. Such a displacement indicator may advantageously be configured to determine an instantaneous position of the mobile element 20 relative to the stator element 22.

According to one advantageous embodiment of the invention, the stator element 22 may comprise an array (for example a linear strip) of magnetic elements, while the mobile element 20 comprises a magnetic field sensor 21 arranged to detect changes in the magnetic field of the array of magnetic elements as it is displaced past the magnetic field sensor. Such an arrangement is depicted in FIGS. 3 to 5. Alternatively, the mobile element 20 may comprise the array of magnetic elements while the stator element 22 comprises the magnetic field sensor 21. The array of magnetic elements (eg ferromagnetic magnets) may be arranged as a linear strip of magnets of alternating polarity; for example. The magnetic field sensor 21 may advantageously be a Hall Effect sensor, and may for example be integrated on a circuit board with other circuit elements. The magnetic field sensor 21 and/or the circuit board may be encapsulated in the insulation of the cable.

The displacement detector may also comprise position encoding means for, on the basis of a plurality of readings from the displacement sensor 21, determining a direction and/or magnitude of displacement, of the mobile element 20 with respect to the stator element 22.

A further refinement of the displacement detector may comprise a plurality of magnetic detector elements in place of the magnetic detector 21 element described above. The magnetic detector elements may for example be arranged with a predetermined regular distribution pattern in the longitudinal direction. In this case, the distribution pattern of the magnetic detectors may be configured to be slightly different from that of the magnetic elements, such that the arrays of magnetic detector elements and magnetic elements function together as a Vernier scale, giving significantly greater accuracy. This Vernier scale arrangement of magnetic detector elements and magnetic elements can also be used in other applications, unrelated to there-gapping of high-voltage cables, where a displacement is to be accurately measured.

By Integrating the displacement indicator components within the cable, for example within a somewhat enlarged section of cable near the end portion 15, it is possible to ensure that the displacement indicator is always correct for the particular type of cable. In the prior art system, in which the same sprung collar with integrated re-gapping indicator was used for different types of cable, it was not possible to be sure of matching the displacement indicator to the particular parameters of the cable, such as, for example, the elastic, plastic or thermo-mechanical properties of the insulation material covering the end portion 15 of each type of cable, or the thickness of this insulation. By incorporating the displacement indicator (yield sensor) components into the cable, this mismatch problem is obviated. The yield sensor elements (20,21,22 in the example) may be all or partially housed within the body 13 of the collar-engaging element, which is itself an integral part of the cable, for example. Furthermore, by incorporating the spring 14 into the cable, as shown in the figures, it is possible to ensure that the spring characteristics and the re-gapping indicator are accurately matched to the mechanical parameters and dimensions of the cable. In this way, it is possible to avoid the kind of operator error which may arise when an operator connects a cable to the high-voltage device using a collar which is not calibrated or configured for the particular cable.

Displacement or force information from the yield sensor (displacement indicator 20, 21, 22) may be communicated, for example by wired or wireless connection, to a remote system such as a control or monitoring system. The circuitry for implementing this communication function may be included on the same circuit board as the magnetic detector 21.

The cable may also include means for receiving communications from a remote control system, and/or from, an operator. Signals received from the remote system or from the operator may be used to operate a predetermined function of the functional circuitry in the cable, such as performing a calibration or settings-adjusting operation, or triggering the outputting of an instantaneous reading.

Such functional circuitry in the cable may be used to send measurement data from the displacement detector to the remote system. Such date may include, for example, the raw detector output data, such as the magnetic field readings, or an operating parameter such as an initial reference position value. Alternatively, or in addition, the data may be pre-processed by the circuitry before transmitting, and may include such derived information as the direction, and/of magnitude of the displacement, or the relative position of the mobile 20 and stator 22 elements. The functional circuitry may include processor, memory and associated elements for calculating such derived information, or for calculating predicted parameters such as the time/date at which a re-gapping will be required. The circuitry may be configured to store historical information of measured or derived parameters, and to transmit this historical information upon request by an operator or by the remote system. The historical information may also be used to derive the predicting parameters as mentioned above. Note that some or all of these calculation and storage functions may instead be performed by the remote system.

Cables such as the cable described here may in reality be subjected to widely varying operating conditions. For example, when the high-voltage device is being used intensively, the temperature of the materials (polymeric insulator, for example) at the connection may rise considerably, and sometimes for extended periods. A large X-ray generator in a packaging plant, for example, might run continuously at elevated temperatures for two successive working shifts and then be switched off and left to cool overnight. The compression in the cable connection can vary significantly over such a cycle. The compression may be well within tolerance while the X-ray generator is operating warm, but be fall out of tolerance when it cools. It is therefore advantageous to ensure that the X-ray generator is not switched on in the morning if the compression force is out of tolerance, in order to avoid the risk of a high-voltage discharge through the under-compressed insulation at the cable connection. This can be ensured by configuring the control system to automatically override the switch-on operation of the high-voltage device if the connection compression is out of tolerance. In some cases, the control system may be configured to permit operation of the high-voltage device at reduced power or reduced voltage while the connection compression is not sufficient for full power or full voltage operation, in a simple case, an out-of-tolerance condition may be used to alert an operator by means of an alarm signal.

Further sensors can also be provided in the cable, for example for detecting or measuring parameters other than the compression force. Such parameters might include, for example, the temperature of the insulation, the current flowing in the cable, the amount of vibration, or a radiation pulse due to a sudden local electrical discharge. One or more of these sensed parameters may also be transmitted to a control system, in order that the parameters may be used, if necessary, to control the operation of the high-voltage device, and/or to signal alarm conditions to an operator.

Any of the above sensing, measuring, controlling and monitoring functions can be configured to be performed automatically, without intervention by an operator.

The invention claimed is:

1. Cable comprising an end portion for connecting, under compression, to a connector of a high-voltage device using a detachable clamping collar, wherein the cable comprises a collar-engaging element for detachably engaging with the detachable clamping collar and for displacing along a longitudinal axis of the cable so as to urge the end portion with a compression force against the connector when the cable is clamped to the high-voltage device, wherein the cable comprises yield sensing means arranged to detect and/or measure a change in force exerted by the collar-engaging element on the end-portion of the cable.

2. Cable according to claim 1, wherein the yield sensing means comprises a binary sensor, adapted to detect a predetermined change in the force exerted by the collar-engaging element on the end-portion of the cable.

3. Cable according, to claim 1, wherein the yield sensing means comprises a multi-level or analogue sensor, adapted to determine a magnitude of the force, and/or a magnitude of the change in the force, exerted by the collar-engaging element on the end-portion of the cable.

4. Cable according to claim 1, wherein the cable comprises spring means arranged to be compressed between the collar-engaging element and the end portion when the cable is connected under compression to the connector.

5. Cable according to claim 1, wherein:
the yield sensing means comprises a displacement sensing means,
the displacement sensing means comprises a stator element and a mobile element, and
the displacement sensing means is configured to detect and/or measure a relative displacement along the longitudinal axis between the stator element and the mobile element.

6. Cable according to claim 5, wherein the displacement sensing means comprises at least a first and a second stator element and at least a first and a second mobile element and wherein the first stator element and the first mobile element comprises a plurality of magnetic elements, and the second stator element and the second mobile element comprise a magnetic field sensor.

7. Cable according to claim 6, wherein the magnetic field sensor is a Hall effect sensor.

8. Cable according to claim 6, wherein the plurality of magnetic elements are arranged as a first linear array of magnetic elements of alternating polarity.

9. Cable according to claim 8, further comprising a second linear array of magnetic elements, wherein
the magnetic elements of the first linear array are evenly distributed along the first linear array with a first longitudinal distribution spacing,
the magnetic elements of the second linear array are evenly distributed along the second linear array with a second longitudinal distribution spacing, and
the first linear distribution spacing is different from the second linear distribution spacing.

10. Cable according to claim 6, wherein the magnetic field sensor is arranged to determine a change in magnetic field strength due to a relative displacement of the stator and mobile elements.

11. Cable according to claim 5, comprising position encoding means for determining a plurality of readings from the displacement sensor and for determining, on the basis of the readings, a direction and magnitude of displacement of the mobile element with respect to the stator element.

12. Cable according to claim 5, wherein at least a part of the displacement sensor is secured to and/or enclosed in an insulation covering of the cable.

13. Cable according to claim 12, wherein the part is the stator element of the displacement sensor.

14. Cable according to claim 1, comprising calibration on means for adjusting a reference parameter of the yield sensing means.

15. Cable according to claim 1, comprising first communication means for communicating at least one of:
a status information of the force exerted by the collar-engaging element on the end-portion of the cable,
a direction and/or magnitude of the relative, displacement, one or more of
a magnetic field readings,
a reference parameter, and
a relative position, to a first remote communications device.

16. Cable according to claim 15, wherein the first communication means is arranged to communicate wirelessly with the first remote communications device.

17. Cable according to claim 1, wherein the cable comprises:
one or more operating parameter sensors for determining one or more operating parameters of the cable,
second communication means for communicating the one or more operating parameters to a second remote communications device.

18. Cable according to claim 17, wherein the one or more operating parameters include a temperature of the cable.

19. System for connecting a cable under compression to a connector of a high voltage device, the system comprising:

a cable comprising an end portion for connecting, under compression, to a connector of a high-voltage device using a detachable clamping collar, wherein the cable comprises a collar-engaging element for detachably engaging with the detachable clamping collar and for displacing along a longitudinal axis of the cable so as to urge the end portion with a compression force against the connector when the cable is clamped to the high-voltage device, wherein the cable comprises yield sensing means arranged to detect and/or measure a change in force exerted by the collar-engaging element on the end-portion (If the cable, first communication means for communicating at least one of:
   a status information of the force exerted by the collar-engaging element on the end-portion of the cable,
   a direction and/or magnitude of the relative displacement, one or more of
     a magnetic field readings,
     a reference parameter, and
     a relative position, to a first remote communications device, and control means for, in response to information received from the first communication means by the first remote communication device, varying one or more operating parameters of the high-voltage device.

20. System according to claim 19, wherein the controlling means is adapted to vary one or more operating parameters of the high-voltage device automatically in response to information received from the first communication means by the first, remote communication device.

\* \* \* \* \*

UNITED STATES PATENT AND TRADEMARK OFFICE
CERTIFICATE OF CORRECTION

PATENT NO. : 9,680,251 B2  Page 1 of 1
APPLICATION NO. : 14/414937
DATED : June 13, 2017
INVENTOR(S) : Stephan Haferl et al.

It is certified that error appears in the above-identified patent and that said Letters Patent is hereby corrected as shown below:

On the Title Page

Item (75):
The country of inventor Iris Schmid should be --(CH)--.
The country of inventor Dominique Corpataux should be --(CH)--.

Signed and Sealed this
First Day of August, 2017

Joseph Matal
*Performing the Functions and Duties of the*
*Under Secretary of Commerce for Intellectual Property and*
*Director of the United States Patent and Trademark Office*